(12) United States Patent
Nooijen

(10) Patent No.: US 6,549,238 B1
(45) Date of Patent: Apr. 15, 2003

(54) SAMPLE-AND-HOLD IRIS CONTROL SYSTEM

(75) Inventor: Johannes B. M. Nooijen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/149,948

(22) Filed: Sep. 9, 1998

(30) Foreign Application Priority Data

Sep. 11, 1997 (EP) .............................. 97202805

(51) Int. Cl.[7] .............................. H04N 5/238
(52) U.S. Cl. ...................... 348/363; 348/375
(58) Field of Search ................. 348/207, 362, 348/363, 364, 375, 207.99, 221.1; 396/245, 246, 213; H04N 5/238

(56) References Cited

U.S. PATENT DOCUMENTS

| | | | | |
|---|---|---|---|---|
| 5,212,598 A | * | 5/1993 | Kikuchi | |
| 5,249,057 A | | 9/1993 | Jeon | |
| 5,880,782 A | * | 3/1999 | Koyanagi et al. | |
| 6,046,771 A | * | 4/2000 | Horii | |
| 6,130,717 A | * | 10/2000 | Arai et al. | |

* cited by examiner

Primary Examiner—Tuan Ho

(57) ABSTRACT

An iris control system uses a sample-and-hold circuit to provide a constant image signal to control an iris of a camera. To facilitate active iris control, a DC-AC converter is used to convert the constant image signal to an AC iris control having a peak amplitude that is based on the DC amplitude of the constant image signal.

6 Claims, 1 Drawing Sheet

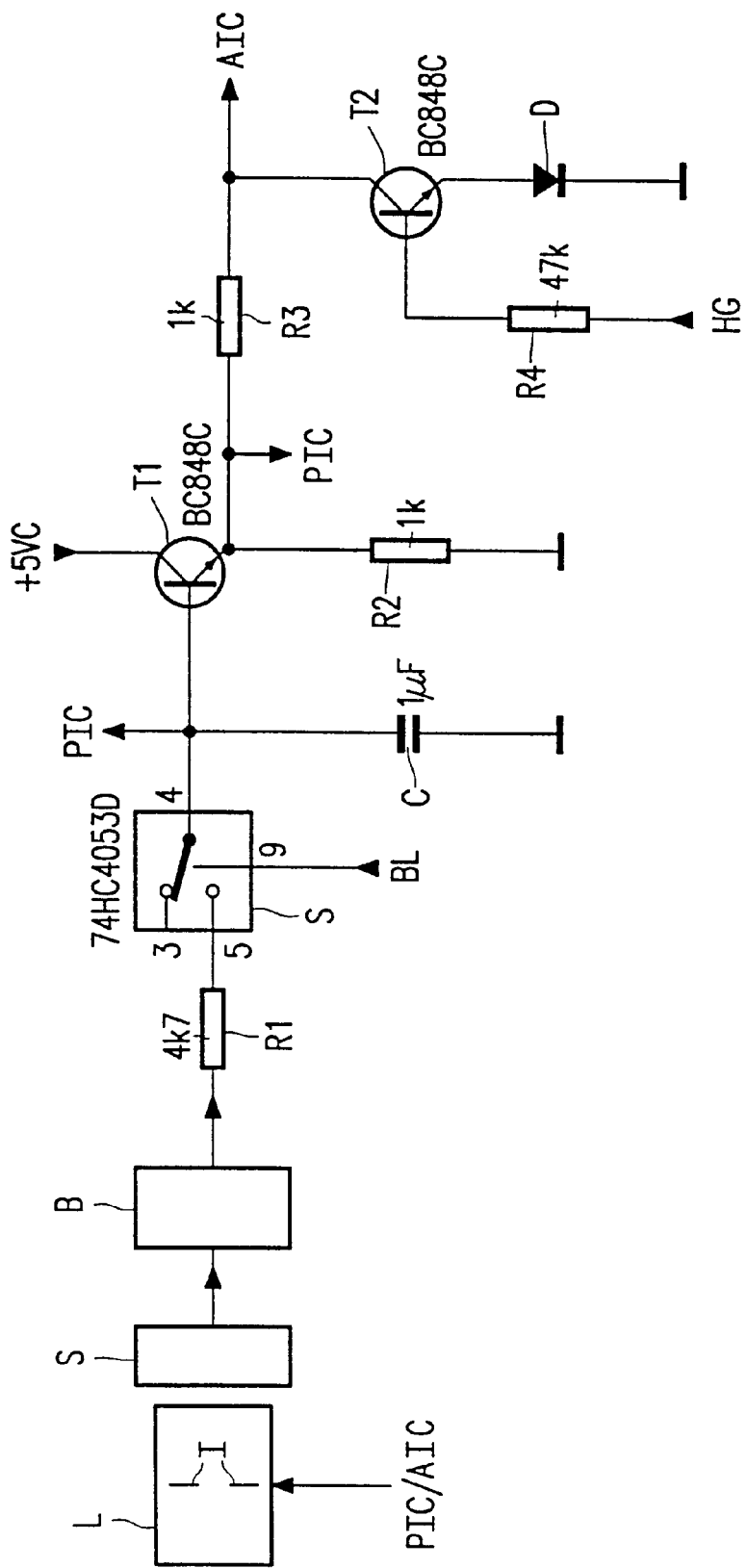

SAMPLE-AND-HOLD IRIS CONTROL SYSTEM

BACKGROUND OF THE INVENTION

1. Field of the Invention

The invention relates to a method and circuit for iris control, and to a camera having such an iris control circuit.

2. Description of the Related Art

Cameras often have interchangeable lenses with an electrically controllable iris. There are two types of iris-controlled lenses: passive iris-controlled lenses, and active iris-controlled lenses. A passive iris-controlled lens only includes coils to realize the iris adaptation. All electronics is situated outside of the lens. An active iris-controlled lens has electronics inside of the lens unit. The iris is commonly controlled by applying a buffered sensor signal to the lens. In response, the lens controls the iris in such a manner, that the amplitude of the sensor signal has a fixed value.

Back-light compensation is commonly realized by decreasing the size of the measurement window used for the exposure control. For example, the measurement window is reduced to a rectangular area or a vertical bar in the middle of the image. For lens control, a same measurement window needs to be used to have the lens control correspond to the exposure control. In some prior art cameras, this is effected by applying the buffered sensor signal to the lens only during the measurement window.

It is, inter alia, an object of the invention to obtain an improved iris control. To this end, a first aspect of the invention provides a method of generating an iris control signal comprising the steps of furnishing an image signal; and subjecting the image signal to a sample-and-hold operation to form the iris control signal. A second aspect of the invention provides a circuit for generating an iris control signal, comprising means for furnishing an image signal; and means for subjecting the image signal to a sample-and-hold operation to obtain the iris control signal. A third aspect of the invention provides a camera comprising a lens having a controllable iris coupled to receive an iris control signal, and the above circuit for generating the iris control signal.

In a method of generating an iris control signal in accordance with a primary aspect of the invention, an image signal is subjected to sample-and-hold operation to obtain the iris control signal.

The invention is based on the recognition that most lenses have problems with control signals which are only available during a given window, instead of being continuously available.

These and other aspects of the invention will be apparent from and elucidated with reference to the embodiments described hereinafter.

BRIEF DESCRIPTION OF THE DRAWING

The drawing includes a sole FIGURE showing a block schematic diagram of an embodiment of a camera in accordance with the present invention.

DESCRIPTION OF THE PREFERRED EMBODIMENTS

In the camera, a lens L has a controllable iris I. The iris is controlled by a passive iris control signal PIC or by an active iris control signal AIC. The image from the lens L is picked up by a sensor S. The image signal from the sensor S is buffered by a buffer B. The output signal of the sensor S (or the buffer B) is applied to image signal processing circuitry which is not shown as it is irrelevant to the present invention.

In accordance with the present invention, the output signal from the buffer B is applied to an integrating circuit comprising a resistor R1 between the buffer B and a first switch input 5, a controllable switch SW having the first switch input 5, another unconnected input 3, and a control input 9 receiving a back-light measurement window signal BL, and a capacitor C between the output 4 of the switch SW and ground. If the iris I is passively controlled, the passive iris control signal PIC could be taken from the output 4 and directly applied to the iris I. However, an emitter-follower is preferably inserted between the output 4 of the switch SW and the iris control signal input of the lens L. To this end, the circuit of FIG. 1 comprises an emitter-follower transistor T1 having a base connected to the output 4, a collector connected to a supply voltage, and an emitter connected to ground thru a resistor R2. The passive iris control signal PIC is then taken from the emitter of the transistor T1.

If the iris I is actively controlled, further elements are necessary as actively controlled irises commonly need an AC input signal AIC the peak-peak value of which corresponds to the amplitude of the DC signal PIC. Hence, the signal at the output of the emitter-follower T1 is chopped. A resistor R3 is connected between the emitter of the transistor T1 and the output supplying the active iris control signal AIC. The chopping action itself is carried out by a transistor T2 having a collector connected to the output supplying the active iris control signal AIC, a base receiving pulses HG at half the line frequency of the image signal thru a resistor R4, and an emitter which is connected to ground thru a diode D. Whenever the half line frequency pulse signal HG is positive, the transistor T2 connects the output supplying the iris control signal AIC to a DC level determined by the diode D. Obviously, the diode D may be absent, in which case the DC level is zero.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. In the circuit claim enumerating several means, several of these means can be embodied by one and the same item of hardware.

What is claimed is:

1. A method of generating an iris control signal comprising the steps:
   furnishing an image signal,
   subjecting the image signal to a sample-and-hold operation to form the iris control signal, and
   subjecting the iris control signal to a DC-AC (direct-current to alternating-current) conversion to form an AC (alternating-current) iris control signal.

2. The method of claim 1, wherein the DC-AC conversion is controlled by a signal having a frequency of one-half of a line frequency of the image signal.

3. A circuit comprising:
   a sensor that converts an image to an image signal,
   a sample-and-hold circuit that forms a DC (direct-current) iris control signal from the image signal, and,
   a DC-AC (direct-current to alternating-current) converter that provides an AC (alternating-current) iris control signal from the DC iris control signal.

4. A circuit as claimed in claim 3, wherein the DC-AC converter is controlled by a signal having a frequency of one-half a line frequency of the image signal.

5. A camera comprising:

a lens having a controllable iris coupled to receive an AC (alternating current) iris control signal;

a sensor that provides an image signal, based on an image from the lens;

a sample-and-hold circuit that forms a DC (direct-current) iris control signal from the image signal; and a DC-AC (direct-current to alternating-current) converter that provides a DC-AC conversion of the iris control signal to form the AC iris control signal.

6. The camera of claim 5, wherein the DC-AC conversion is controlled by a signal line frequency of the image signal.

* * * * *